R. A. GRANQUIST.
ELECTRIC LIGHT CONTROLLER.
APPLICATION FILED APR. 8, 1914.

1,250,302.

Patented Dec. 18, 1917.
2 SHEETS—SHEET 1.

Inventor
R.A. GRANQUIST

Witnesses

By Watson E. Coleman
Attorney

R. A. GRANQUIST.
ELECTRIC LIGHT CONTROLLER.
APPLICATION FILED APR. 8, 1914.
1,250,302.
Patented Dec. 18, 1917.
2 SHEETS—SHEET 2.
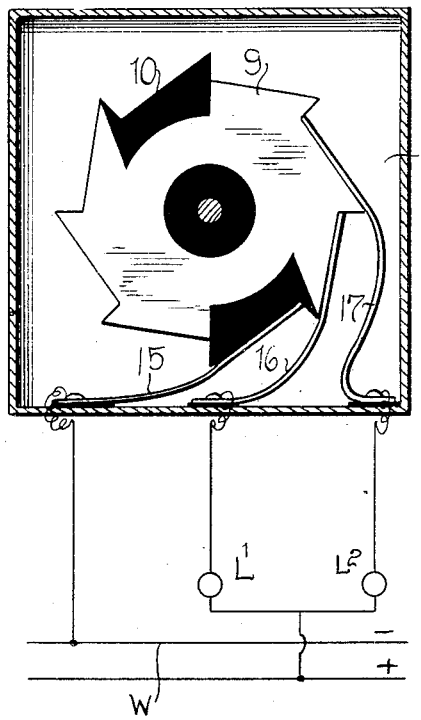
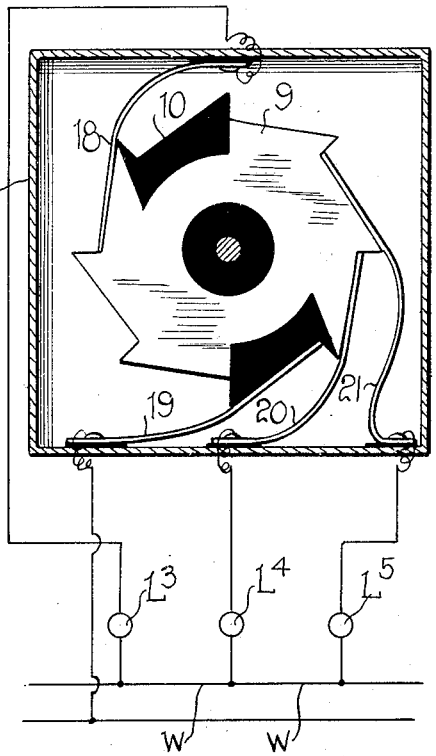
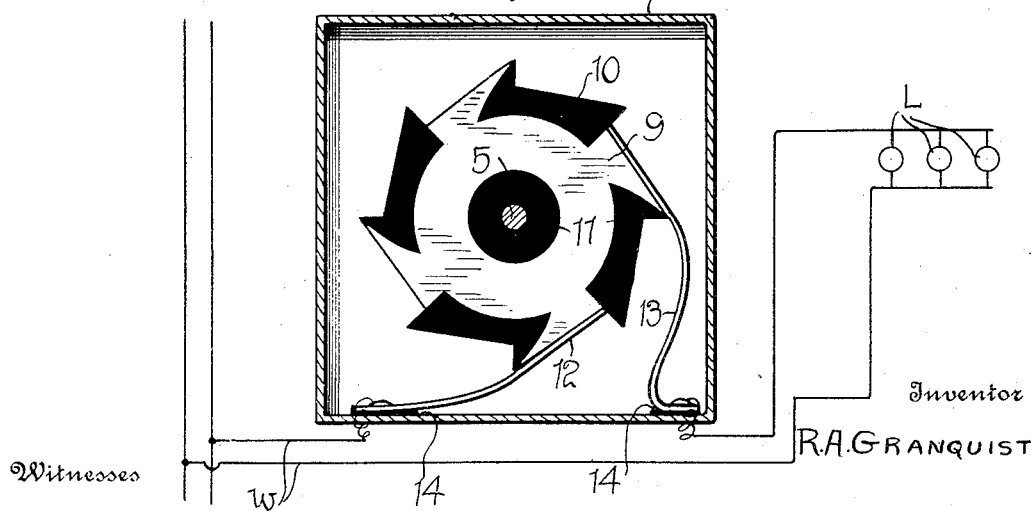

UNITED STATES PATENT OFFICE.

RAPHAEL ANTON GRANQUIST, OF WEST DULUTH, MINNESOTA.

ELECTRIC-LIGHT CONTROLLER.

1,250,302.  Specification of Letters Patent.  Patented Dec. 18, 1917.

Application filed April 8, 1914. Serial No. 830,447.

*To all whom it may concern:*

Be it known that I, RAPHAEL ANTON GRANQUIST, a citizen of the United States, residing at West Duluth, in the county of St. Louis and State of Minnesota, have invented certain new and useful Improvements in Electric-Light Controllers, of which the following is a specification, reference being had to the accompanying drawings.

This invention relates to electric light controllers.

One object of this invention is to provide a current controller including a rotatable member and contacts co-acting therewith, so constructed that a relative rotation of the member in one direction will permit passage of current through certain lines; further rotation of the member will permit the passage of current through certain other lines; a still further rotation will cut off current from certain lines and permit the passage of current through certain other lines and a still further rotation will cut off the flow of current from all lines.

A further object is to eliminate the employment of expensive switches in the walls of buildings and of installing costly wiring to control the lighting of the lamps, common bell buttons or pushes sunk flush in the door casings or the like, and bell wires leading from the buttons to the controller and to batteries located in the basement of the building, or other convenient place, being utilized for the purpose, so that any number of pushes may be used in controlling any light.

A further object is to construct the apparatus in such a manner as to permit of its being housed in the canopies of the fixtures so as to be concealed from view, and yet ready of access should repairs be necessary.

The final object of the invention is to adapt the apparatus for use either as a one, two, or three circuit switch, as may be preferred, with other connections possible if required.

With the above and other objects in view, as will appear as the nature of the invention is better understood, the same consists in the novel construction and combination of the parts of an electric light controller as will be hereinafter fully described and claimed.

In the accompanying drawings forming a part of this specification, and in which like characters of reference designate corresponding parts:

Fig. 4 is a plan of the upper half of the casing displaying a commutator for a one-circuit switch; and Figs. 5 and 6 are similar views of a two and three circuit switch.

Figure 1:
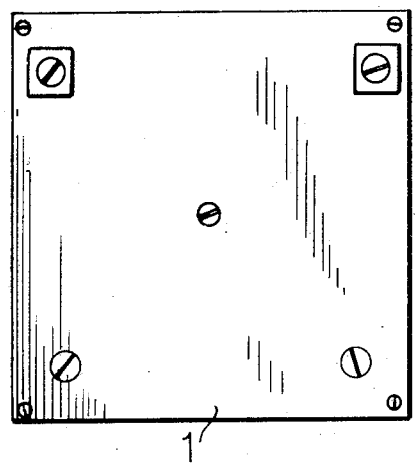
Figure 1 is a front elevation of the casing containing the light controlling mechanism.
Figure 2:
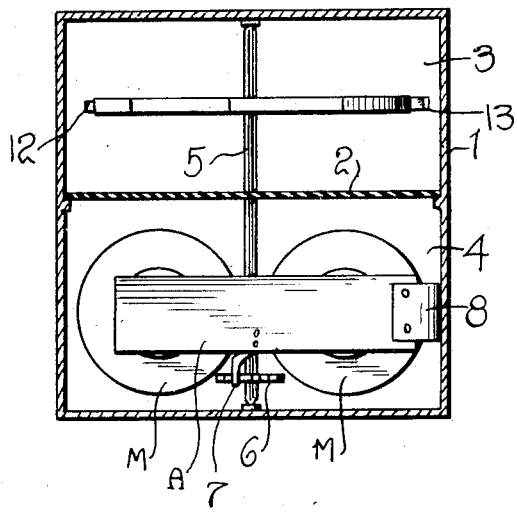
Fig. 2 is a similar view with a part of the casing removed.
Figure 3:
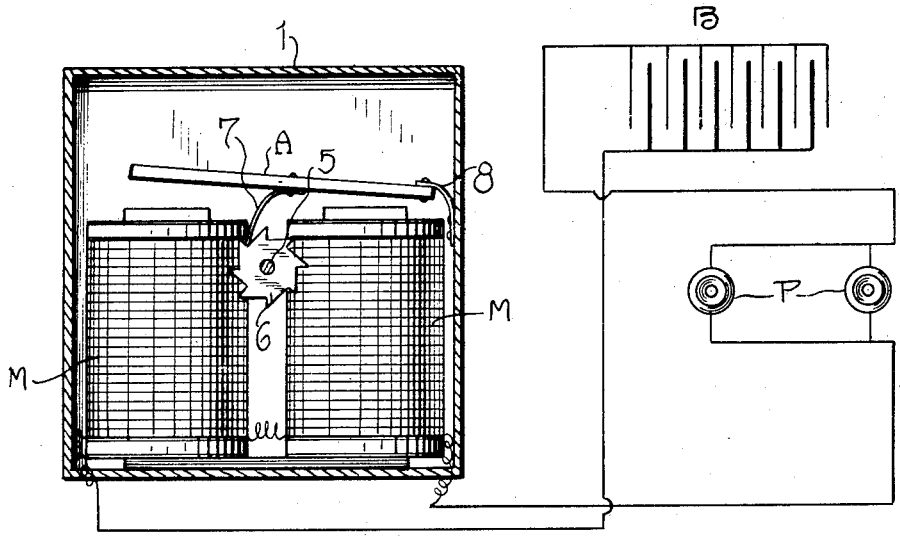
Fig. 3 is a view in plan of the lower half of the casing, showing the connection between the push buttons and battery, and the light controlling mechanism.

The casing 1 may be of any suitable material, and is divided by insulation 2, such as mica, into an upper and a lower chamber 3 and 4 respectively. Journaled in suitable bearings in the upper and lower wall of the casing is a shaft 5 carrying adjacent to one end and within the chamber 3 a commutator, and adjacent to its other end a ratchet wheel 6, that is designed to be engaged by a spring dog or pawl 7 carried by an armature A mounted on one end of a spring 8 secured to one of the side walls of the casing. Arranged in the chamber 4 are two connected electro-magnets M, the cores of which are arranged to attract the armature A and thus cause the dog 7, by engagement with the ratchet wheel 6 to rotate the shaft 5 and thus impart a step by step motion to the commutator shaft. The magnets are energized by a battery B, included in one branch of which, are two or more push buttons P, which, in a manner that will be hereinafter shown, will operate to control any light as desired. The commutator to which reference has been made consists in this instance of a metallic disk 9 having a plurality of relatively flat faces, certain faces of the disk being rendered dead or non-conductive by being insulated from certain other faces of the commutator disk. This insulation in the drawings is designated 10 and these insulated faces may be formed by inserting in the metallic disk 9, sections of fiber, porcelain or like insulating material. All of these faces are defined by ratchet teeth. The ends of the inserted sections of insulating material are angularly disposed with relation to each other so as to diverge outward. One of the ends of each section is disposed in a plane radial to the center of the commutator and projects sufficiently to form a tooth adjacent the next face of the commutator. The opposite end of the section projects upwardly to form a radial face adjacent the flat face or head, while the inner face of each section is arcuate. This end face of the section does not extend in a plane radial to the center of motion of the commutator, but on the chord of the circle so that each section is interlocked with the body of the commutator and is held firmly in position and from any radial movement. This peculiar form given to the segments provides for the tooth formed at the end of each section 10 having a relatively wide base, whereas if this end of the section 10 were radial, the tooth would be of relatively thin material which would not stand the wear incident to the friction of the spring contacts 15, 16 and 17 thereon. The disk 9 of the commutator is insulated from the shaft 5 by means of insulating material 11. As illustrated in Fig. 4, four of the faces of the commutator are insulated while in the form shown in Figs. 5 and 6, but two of the faces are insulated and these are disposed diametrically opposite each other. The faces shown in Fig. 4 are laterally engaged by two spring contacts 12 and 13 with which connect the terminals of the line wires W in which are included the lamps L, the point of connection between the contacts and the casing being insulated at 14, the same being true of the other two forms of the invention. The several faces of the commutator are bounded by ratchet teeth for the purpose of causing the locking of the commutator disk from rearward movement and for the purpose of causing a lifting of the spring contacts from the faces of the commutator disk when the disk is rotated. The construction shown in Fig. 5 is the same as that shown in Fig. 4, except that three spring contacts, 15, 16 and 17 are employed, the contacts always being in engagement with the faces and teeth of the commutator.

In the form of the invention shown in Fig. 6, four spring contacts, 18, 19, 20 and 21 are employed, these being suitably connected with the wires W and all engaged with the faces of the commutator.

From the foregoing description it is thought that the operation of the controller will be apparent. Referring to Fig. 4, the spring contacts 12 and 13 are in engagement with faces of the commutator, that the current will pass to the lamps. Should it be desired to extinguish the lamps any push buttons which are on the battery circuit, may be pressed, which will rotate the commutator one tooth, thereby bringing the contacts 12 and 13 into engagement with the insulation and cutting off the current to the lamps. Upon the same or any other push button being pressed, the lamps will again be caused to glow.

With the parts in the position shown in Fig. 5, the lamps $L'$ and $L^2$ are dead, but as soon as a push button is actuated to impart a one-step motion to the commutator, the spring contact 15 will pass from the insulated face with which it was previously engaged to the next adjacent face of the commutator, thereby sending the current through the lamps $L^2$. Another push on any button will extinguish the lamps $L^2$ and turn on the lamps $L'$. Still another push will light all of the lamps, and the next push will extinguish them.

With the commutator as shown in Fig. 6, the lamps $L^3$, $L^4$ and $L^5$ are dead, but as soon as any one of any number of push buttons is pressed, the lamps $L^5$ will be lighted. Another push on any button will extinguish the lamps $L^5$ and light the lamps $L^3$ and $L^4$, and another push will light all of the lamps and another one extinguish them.

The structure as a whole is exceedingly simple, will be found positive in operation, and will secure the object sought in a thoroughly efficient manner.

While I have described my current controlling device as applied to lamps, it will be obvious that it may be used for controlling current under many other circumstances and that it is, therefore, not limited to use for controlling lighting circuits. It will further be obvious that while I have illustrated a specific means for causing a step by step rotation to the commutator, yet any other desired means may be used for this, or the commutator, under certain circumstances, may be given a step by step rotation by hand.

Having thus described my invention, what I claim is:

A rotatable current controller including a commutator formed of electrically conductive material, having a plurality of flat tangentially arranged faces and a plurality of recesses, a plurality of inserted sections of insulating material having flat outer faces arranged tangentially to the circumference of the commutator, the greater portion of each section being disposed below the periphery of the commutator, the rear edge of each insulated section extending radially and projecting beyond the adjacent surface of the commutator body and forming a tooth adjacent the next face of the commutator body, the opposite end of the insulating section being outwardly extended to form a tooth, the outer extremity of which is conterminus with the next adjacent face on the body, and resilient contacts engaging flat against the several faces.

In testimony whereof I hereunto affix my signature in the presence of two witnesses.

RAPHAEL ANTON GRANQUIST.

Witnesses:
WILLIAM HOLM,
JOHN A. FORSMAN.

Copies of this patent may be obtained for five cents each, by addressing the "Commissioner of Patents, Washington, D. C."